US012221807B2

(12) United States Patent
Murray et al.

(10) Patent No.: US 12,221,807 B2
(45) Date of Patent: Feb. 11, 2025

(54) DEADBOLT ASSEMBLY

(71) Applicants: Craig James Murray, Berkshire (GB); Thomas Mark James Manning, Berkshire (GB); Andrew Allan Staines, Hampshire (GB)

(72) Inventors: Craig James Murray, Berkshire (GB); Thomas Mark James Manning, Berkshire (GB); Andrew Allan Staines, Hampshire (GB)

(73) Assignee: Surelock McGill Limited, Wokingham (GB)

( * ) Notice: Subject to any disclaimer, the term of this patent is extended or adjusted under 35 U.S.C. 154(b) by 161 days.

(21) Appl. No.: 18/098,819

(22) Filed: Jan. 19, 2023

(65) Prior Publication Data

US 2023/0235596 A1 Jul. 27, 2023

(51) Int. Cl.
*E05B 47/00* (2006.01)
*E05B 63/00* (2006.01)

(52) U.S. Cl.
CPC ...... *E05B 47/0002* (2013.01); *E05B 47/0012* (2013.01); *E05B 63/0017* (2013.01); *E05B 2047/0017* (2013.01); *E05B 2047/002* (2013.01); *E05B 2047/0024* (2013.01)

(58) Field of Classification Search
CPC ....... E05B 47/00; E05B 47/0001-0006; E05B 47/0012; E05B 2047/0013-0017; E05B 2047/002; E05B 2047/0021; E05B 2047/0022; E05B 63/00; E05B 63/0017
USPC .......................................................... 70/277
See application file for complete search history.

(56) References Cited

U.S. PATENT DOCUMENTS

| | | | | | |
|---|---|---|---|---|---|
| 4,248,068 | A * | 2/1981 | Esser | E05B 63/0017 | 70/389 |
| 4,518,178 | A * | 5/1985 | Bengtsson | E05C 9/025 | 70/370 |
| 4,548,432 | A * | 10/1985 | Bengtsson | E05C 9/02 | 292/8 |
| 2015/0033808 | A1* | 2/2015 | Taylor | E05B 47/0001 | 70/101 |

FOREIGN PATENT DOCUMENTS

| | | | | |
|---|---|---|---|---|
| DE | 9317370 | | 1/1994 | |
| GB | 2119013 | | 11/1983 | |
| GB | 2119013 | A * | 11/1983 | E05C 9/025 |
| GB | 2413822 | | 11/2005 | |
| GB | 2520666 | | 6/2015 | |

OTHER PUBLICATIONS

Machine Translation of Abstract for DE 9317370, Google Patents, retrieved Dec. 13, 2023.

* cited by examiner

*Primary Examiner* — Nathan Cumar
(74) *Attorney, Agent, or Firm* — Michael S. Hargis; Stites & Harbison PLLC

(57) ABSTRACT

A lock mechanism having a bolt movable between a thrown position and a retracted position, and a deadbolt assembly includes a sliding deadbolt configured to slide between a locked position in which the sliding deadbolt inhibits retraction of the bolt and an unlocked position. The sliding deadbolt includes a first anti-thrust cam configured to restrain the sliding deadbolt in the locked position, and a release driver arranged such that, when driven, the release driver releases the first anti-thrust cam from restraining the sliding deadbolt in the locked position and slides the deadbolt to the unlocked position.

24 Claims, 8 Drawing Sheets

DEADBOLT ASSEMBLY

TECHNICAL FIELD

The present invention relates to a deadbolt assembly for controlling access, for example, to a room or building. More particularly the invention relates to a deadbolt assembly, which forms part of a lock mechanism, in which a sliding deadbolt constrains movement of a bolt, and an anti-thrust cam prevents bouncing or manipulation of the sliding deadbolt.

BACKGROUND

A prior art bolting mechanism incorporating a deadbolt is disclosed in GB 2413822. The bolting mechanism is a multi-point bolting mechanism providing bolts that move to secure a door, or leaf, at the top, bottom and opening side of the door or leaf. An example multi-point bolting system on a door 2 is shown in FIG. 1. The central bolting mechanism that drives the bolts is indicated by 1 in the figure. The bolts that move to secure the top and bottom of the door are indicated by 4 and the bolt for securing the opening side of the door is indicated by 5. The three bolts are thrown and retracted together by operation of the central bolting mechanism. The central bolting mechanism is configured such that one of the bolts, for example the bolt that moves to secure the top of the door, may have its movement blocked by a rotatable deadbolt or latch that engages in a recess in the bolt. Since all three bolts are driven together, by securing one of the bolts against movement, all of the bolts are secured. Rotation of the deadbolt or latch to block movement of the bolts is provided by operation of a key cylinder. With the deadbolt or latch released, the bolts may be thrown or retracted by rotation of handle shown in FIG. 1.

FIG. 2 shows the internal components of a bolting mechanism 10 similar to that of FIG. 1. The bolting mechanism of FIG. 2 differs from that of FIG. 1 in that FIG. 2 comprises a single bolt. However, the arrangement may be readily modified to a multi-point bolting mechanism. In FIG. 2, the bolt 11 is shown in a position extending laterally from the bolting mechanism 10, such as for securing a door at its opening side. The bolt 11 can be moved laterally between a thrown position and a retracted position. The bolting mechanism comprises a rotor 20 which may be driven by a handle (not shown). Rotor 20 has teeth engaging with teeth on the bolt. Rotation of the rotor 20, as shown by arrow B in FIG. 2, may retract the bolt. Bolting mechanism further comprises internal bolt 30 which also has teeth engaging with rotor 20. Rotation of the rotor 20 may be blocked by internal bolt 30 if sliding deadbolt 40 is positioned to extend into an aperture 32 in the internal bolt 30. The position of the sliding deadbolt 40 is determined by use of a key cylinder 50 or solenoid 60. The sliding deadbolt 40 is configured for lateral translation in the direction shown by arrow A in FIG. 2.

In FIG. 2 the sliding deadbolt 40 is shown in the thrown position with an end of the sliding deadbolt positioned in the aperture of the internal bolt 30 thereby blocking movement of the internal bolt 30 and also preventing rotation of rotor and movement of bolt 11. Hence, in this position it will not be possible to turn the handle to drive the rotor 20 and the door or leaf remains locked. The sliding deadbolt 40 may be retracted by a tang 52 of the key cylinder 50. On insertion of a matching key into the key cylinder 50, the barrel of the key cylinder may be turned. Clockwise rotation of the key (based on the orientation shown in the figure) will rotate the tang 52 of the key cylinder. The tang 52 will push against sidearm 42 of the sliding deadbolt 40 to retract the sliding deadbolt from the aperture 32 in the internal bolt 30. Further rotation of the key in the key cylinder will cause the tang 52 to move past the side arm and the key may be rotated a full circle and be removed from the key cylinder. The bolting mechanism in FIG. 2 further comprises a solenoid 60. In an alternative to moving the sliding deadbolt by the tang 52, the sliding deadbolt 40 may be driven by solenoid 60. A solenoid has a core which is moved to extend from, or retract into. the solenoid body depending on whether an electrical voltage or power is applied or turned off. Solenoids can be provided with alternative configurations such that they either require power to move the core into the extended position or require power to retract the core into the solenoid body. In the first configuration the solenoid shown in FIG. 2 is unpowered. On application of power the core 62 of the solenoid is retracted into the solenoid body. The retraction of the core 62 retracts the sliding deadbolt 40 from the aperture 32 releasing the internal bolt 30 for movement. In the alternative configuration, the solenoid in FIG. 2 is fitted in the reverse orientation so when powered the tail end of the core is thrown and turning off the power causes the core tail to retract into the solenoid. This movement of the core retracts the sliding deadbolt and releases the internal bolt.

Accordingly, whether by rotation of the key in the key cylinder 50 or retraction of the core 62 into the solenoid 60 the internal bolt 30 and rotor 20 are released and the bolt 11 may be retracted.

A problem with the bolting mechanism of FIG. 1 is that the solenoid core and sliding deadbolt are relatively heavy. This relatively large unsecured (or 'floating') weight means that they could be susceptible to being manipulated from the position in which they prevent movement of the bolt 11 to the position in which the bolt 11 can be retracted. For example, impacting the bolting mechanism or manipulation with a probe could release the sliding deadbolt and could result in forced entry through the door.

SUMMARY OF THE INVENTION

The present invention provides a lock mechanism, comprising: a bolt movable between a thrown position and a retracted position; and a deadbolt assembly comprising: a sliding deadbolt configured to slide between a locked position in which the sliding deadbolt inhibits or prevents retraction of the bolt and an unlocked position in which the bolt is movable, the sliding deadbolt comprising a first anti-thrust cam configured to restrain the sliding deadbolt in the locked position, and a release means or driver arranged such that, when driven, the release means or driver releases the first anti-thrust cam from restraining the sliding deadbolt in the locked position and then slides the deadbolt to the unlocked position. In other embodiments, the deadbolt assembly may be provided without a release means or driver but is configured to receive, or have fitted later, the release means or driver that releases the first anti-thrust cam and slides the deadbolt to the unlock position. In the thrown position the bolt may be arranged, for example, to extend into a keeper to secure a door or leaf on which the lock mechanism is mounted. In the retracted position the bolt is, at least partly retracted in to the lock mechanism and does not extend into, for example, a keeper, and the door or leaf on which the lock mechanism is mounted may be opened. The sliding deadbolt prevents the bolt or bolts from being pushed to a retracted position by a force applied on the end of the bolt or bolts.

The first anti-thrust cam prevents movement of the sliding deadbolt as may be caused by impacts on, or manipulation of, the bolting mechanism. Such movements may be momentary but could be sufficient to allow the bolt to be released and the door or leaf on which the lock mechanism is mounted may be breached. Furthermore in embodiments, the sliding deadbolt may also be driven by a solenoid having a solenoid core. The relatively large weight of the sliding deadbolt and/or the solenoid core may be sufficient to enable them to be bounced by an impact. The first anti-thrust cam provides this anti-bounce feature by providing an additional restraint to the sliding deadbolt such that bounce back of the sliding deadbolt is not possible. Additionally, the first anti-thrust cam is relatively light in weight so is less susceptible to being bounced by impact.

The release driver may be one or more of the group comprising: a rotatable tang of a key cylinder or rim adaptor; a core of a solenoid; a motor and a mechanical override.

The first anti-thrust cam may be pivotably coupled to the sliding deadbolt and the sliding deadbolt may comprise an aperture or recess into which the first anti-thrust cam moves or moves further under action of the release driver.

The first anti-thrust cam may be pivotably coupled to the sliding deadbolt towards an end of the sliding deadbolt that inhibits retraction of the bolt.

The first anti-thrust cam may be biased such that the distal end of the first anti-thrust cam is pushed out from the aperture when the first anti-thrust cam restrains the sliding deadbolt.

The first anti-thrust cam may comprise a release surface at an end distal to its pivot and the release driver may comprise a key driven release driver such as a rotatable tang of a key cylinder or rim adaptor. A key cylinder may have a barrel, which on insertion of a matching key is able to rotate a tang extending transversely from the middle or rear of the barrel. A rim adaptor may be used in combination with a rim cylinder. The rim cylinder may have a tailpiece extending from the rear and the tailpiece may locate in a slot in the rim adaptor for driving the rim adaptor. The key cylinder or rim adaptor may be configured such that on rotation of the tang the tang pushes against the release surface releasing the first anti-thrust cam.

The first anti-thrust cam may comprise a receiver and the deadbolt assembly may comprise a detent or catch. The detent or catch may be attached to a casing part of the deadbolt assembly or other fixed part of the deadbolt assembly. The first anti-thrust cam may be arranged such that when it restrains the sliding deadbolt in the locked position the receiver engages the detent. The receiver may comprise a channel or c-shaped recess section and the detent may comprise a pin or stud which locates in the channel or c-shaped recess section when the first anti-thrust cam restrains the sliding deadbolt in the locked position.

The first anti-thrust cam preferably requires movement for release in a direction orthogonal to the slide direction of the sliding deadbolt. This means that impact in one direction by someone trying to force entry would be unlikely to release both the sliding deadbolt and first anti-thrust cam. The light weight of the first anti-thrust cam, as mentioned above, further results in making it difficult to bounce the first anti-thrust cam and sliding deadbolt.

The lock mechanism may further comprise a second anti-thrust cam pivotably coupled to the sliding deadbolt. The second anti-thrust cam may be configured for rotational movement in cooperation, that is movement of one causes movement of the other, with the first anti-thrust cam. The first anti-thrust cam and second anti-thrust cam may be commonly driven by the release driver.

The release driver, for example, when it is an electrical release driver such as a solenoid or motor, may be arranged such that when driven it rotates the second anti-thrust cam causing rotation of the first anti-thrust cam releasing the first anti-thrust cam from restraining the sliding deadbolt in the locked position. Further driving of the release driver may cause sliding of the deadbolt to the unlocked position.

The first anti-thrust cam and second anti-thrust cam may comprise intermeshing teeth to transfer rotational movement between the first anti-thrust cam and second anti-thrust cam. Alternative features to intermeshing teeth may be provided to transfer to rotational movement between the first and second anti-thrust cams. For example, the cams could push against each, the cams may act as levers against each other, or the cams may be coupled to each other by a belt of chain. Other alternatives are also possible.

The sliding deadbolt may comprise a drive fork, for example which extends substantially transversely, or partly transversely, to the slide direction of the deadbolt. The second anti-thrust cam may be arranged between the prongs of the drive fork.

The release driver may be a solenoid or motor, and the second anti-thrust cam may be arranged to be driven by the solenoid or motor. In embodiments, the lock mechanism may comprise two release drivers: the first release driver, which may be the tang of a key cylinder or rim adaptor, may operate on the first anti-thrust cam; and the second release driver may be the solenoid or motor and may operate on the second anti-thrust cam. The release drivers may be arranged such that, when one of the release drivers is driven, the driven release driver releases the first anti-thrust cam from restraining the sliding deadbolt in the locked position and slides the deadbolt to the unlocked position.

The lock mechanism may further comprise an additional release driver which is the mechanical override. The mechanical override may comprise a projection, which may for example be known as a nose projection, extending transversely from the second anti-thrust cam and arranged to be acted on for rotational movement of the second anti-thrust cam to release the sliding deadbolt.

The bolt, or a slider of the bolt, may be arranged to push against the projection, or nose projection, to rotate the second anti-thrust cam and release the sliding deadbolt as the bolt is moved to the retracted position.

The second anti-thrust cam may be pivoted towards an end proximal to the first anti-thrust cam.

The release driver may comprise a key cylinder or rim adaptor and the sliding deadbolt may comprise a release surface configured to be acted on by the rotatable tang of the key cylinder or rim adaptor such that on rotation of the tang, the tang releases the first anti-thrust cam, and pushes against the release surface of the sliding deadbolt to retract the sliding deadbolt and release the bolt for movement.

The sliding deadbolt may comprise a side arm which may project transversely from the slide direction of the sliding deadbolt and the release surface may be provided on the sidearm.

The drive fork of sliding deadbolt may project transversely to the slide direction of the sliding deadbolt. The lock mechanism may further comprise a solenoid having a core connected to a drive rod. The drive rod may be coupled to the second anti-thrust member and between the prongs of the drive fork. The drive rod may be configured to drive the second anti-thrust member and the sliding deadbolt for release of the sliding deadbolt.

The lock mechanism may further comprise front and back plates, such as of a casing, between which the sliding deadbolt may be configured to move. The sliding deadbolt may comprise guides arranged to move in slots of the front and back plates to guide movement of the sliding deadbolt between the locked position and the unlocked position.

The front and back plates may further comprise apertures through which a key cylinder or rim adaptor is mounted.

The bolt may comprise a recess, which in the retracted position, may receive an end of the sliding deadbolt to inhibit retraction of the bolt.

We have described above that the lock mechanism may comprises a key cylinder or rim adaptor, solenoid or motor, or mechanical override. The lock mechanism may comprise one, two or all of these as the release driver.

The present invention further provides a multi-point bolting mechanism comprising the lock mechanism described above, and further comprising one or more additional bolts arranged to be driven together with the bolt of the lock mechanism.

The present invention further provides a deadbolt assembly comprising: a sliding deadbolt configured to slide between a locked position in which the sliding deadbolt inhibits retraction of a bolt and an unlocked position, the sliding deadbolt comprising a first anti-thrust cam configured to restrain the sliding deadbolt in the locked position, and a release driver arranged such that, when driven, the release driver releases the first anti-thrust cam from restraining the sliding deadbolt in the locked position and slides the deadbolt to the unlocked position.

The deadbolt assembly may further comprise a second anti-thrust cam pivotably coupled to the sliding deadbolt and configured for rotational movement in cooperation with the first anti-thrust cam.

The deadbolt assembly may further comprises any of the features set out above regarding the deadbolt assembly which forms part of the lock mechanism.

The present invention further provides a bolting mechanism comprising the deadbolt assembly set out above.

There is further provided a deadbolt assembly comprising: a sliding deadbolt configured to slide between a locked position in which the sliding deadbolt inhibits retraction of a bolt and an unlocked position. The deadbolt assembly may be configured to receive a first release driver, wherein the first release driver may be driven by a key, such as a key cylinder or rim adaptor. The deadbolt assembly may further comprise a second release driver, wherein the second release driver may be a mechanical override or electrical release driver such as a solenoid or motor. The sliding deadbolt may further comprise: a first anti-thrust cam configured to restrain the sliding deadbolt in the locked position, the first anti-thrust cam configured for driving by the first release driver; and a second anti-thrust cam coupled to the sliding deadbolt and configured for rotational movement in cooperation or common with the first anti-thrust cam. The second anti-thrust cam may be configured for driving by the second release driver. The release drivers may be arranged such that, when one of the release drivers is driven, the driven release driver releases the first anti-thrust cam from restraining the sliding deadbolt in the locked position and slides the deadbolt to the unlocked position. Features described above in relation to other embodiments may be combined with this deadbolt assembly.

The present invention also provides a door or leaf comprising mounted thereto the lock mechanism, the multi-point bolting mechanism, the deadbolt assembly or the bolting mechanism set out above.

BRIEF DESCRIPTION OF THE DRAWINGS

Embodiments of the present invention, and aspects of the prior art, will now be described with reference to the accompanying drawings, of which.

DETAILED DESCRIPTION

Figure 1:
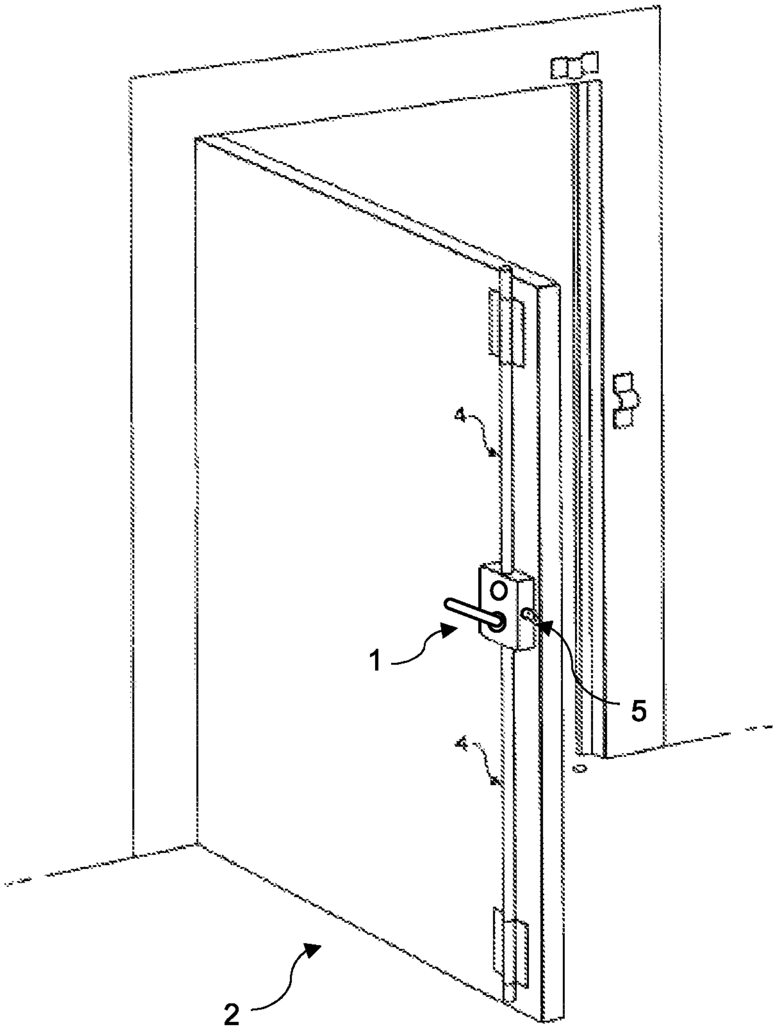
FIG. 1 is a perspective diagram of a multi-point bolting system on a door, according to the prior art.
Figure 2:
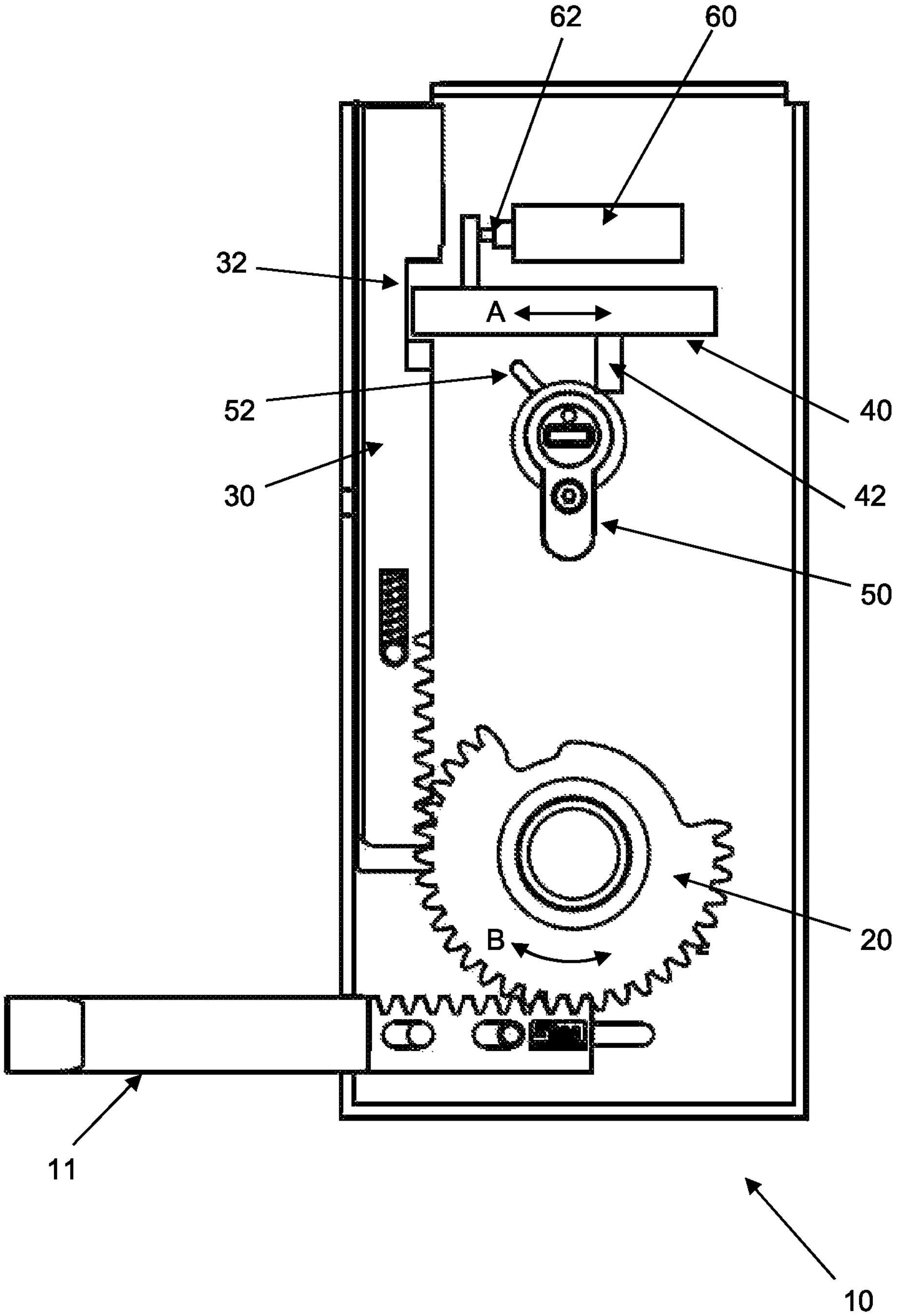
FIG. 2 is a plan diagram of a bolting mechanism according to the prior art.
Figure 3:
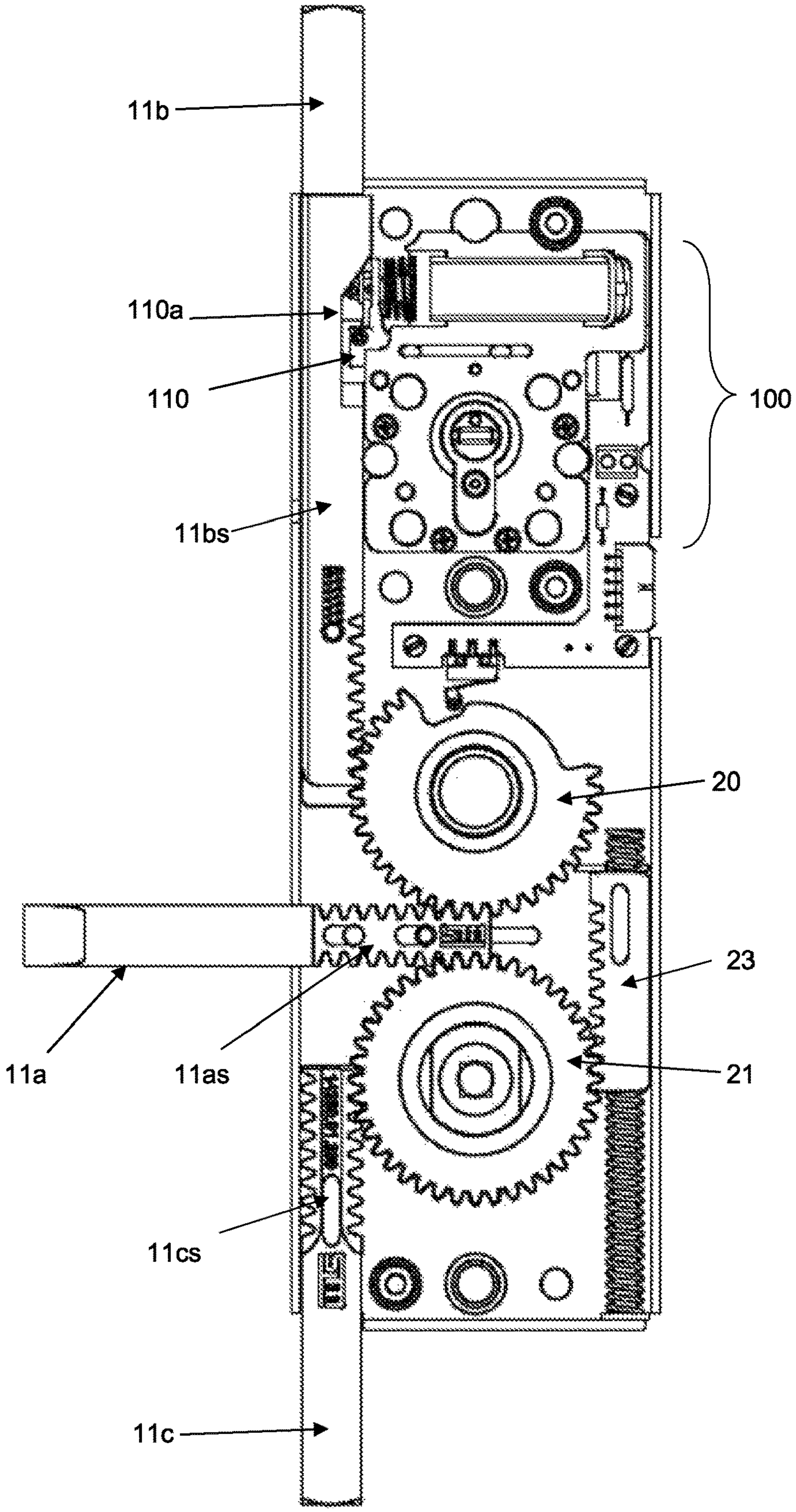
FIG. 3 is a plan diagram of a multi-point bolting mechanism including a deadbolt assembly, according to an embodiment of the present invention.

FIG. 3 is a plan diagram of a mechanism of a multi-point bolting mechanism according to an embodiment of the present invention. The bolting mechanism is similar to the arrangement of FIG. 2 in that it has a laterally movable bolt which is driven by a rotor 20. In FIG. 3 the laterally movable bolt is indicated by 11*a*. In the embodiment of FIG. 3, a second rotor 21 is provided which allows the mechanism to be mounted on left-handed or right-handed opening doors. That is, either the first rotor 20 or second rotor 21 may be connected by a spindle for driving by handle. The selection of which rotor is driven by the handle will be based on the direction required for rotation of the handle. Hence, for the arrangement in FIG. 3 it will be conventional for the handle to rotate clockwise to retract the bolt and hence the handle is preferably mounted for rotating the second rotor 21. An alternative method for changing the handedness would be to maintain the handle connected to rotor 21 and turn the bolting mechanism over or around for use on an opposite handed door to that shown in the figure. The bolting mechanism of FIG. 3 also includes two other bolts 11*b*, 11*c*, which are similar to bolts 4 in FIG. 1 for securing the top and bottom of a door or leaf. The bolts 11*b* and 11*c* in FIG. 3 may be relatively longer than shown in the figure to reach the top and bottom of the door or have connecting rods to extend to fit the length of the door. The bolt 11*b* is also similar to internal bolt 30 of FIG. 2. Bolt 11*a* is provided between rotors 20 and 21 and transfers rotation of one of the rotors to rotate the other rotor. In doing so the bolt 11*a* is translated to retract the bolt or the throw the bolt. Bolt 11*c* is driven by rotor 21 and bolt 11*b* is driven by rotor 20.

One of the bolts of the multi-point bolting mechanism may be secured by a sliding deadbolt 110 of deadbolt assembly 100. The sliding deadbolt is thrown to be located in cutout or recess 110*a* of bolt 11*b*. In other embodiments the sliding deadbolt may act to restrain other of the bolts of a multi-point bolting mechanism or on the bolt of a single bolt lock mechanism. The multi-point bolting mechanism of FIG. 3 is provided as an example of a bolting mechanism which the deadbolt assembly may be used with. Mechanisms other than that of FIG. 3 may be provided which include a bolt that is restrained by the deadbolt assembly of the present invention.

Figure 4:
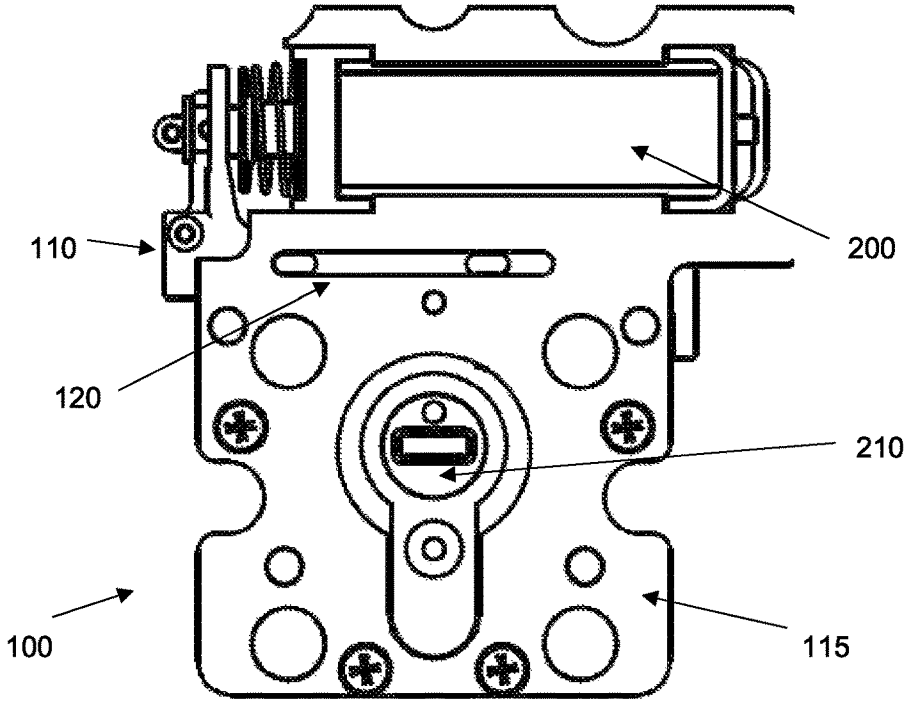
FIG. 4 is a plan diagram of the deadbolt assembly according to a first embodiment of the present invention.
Figure 5:
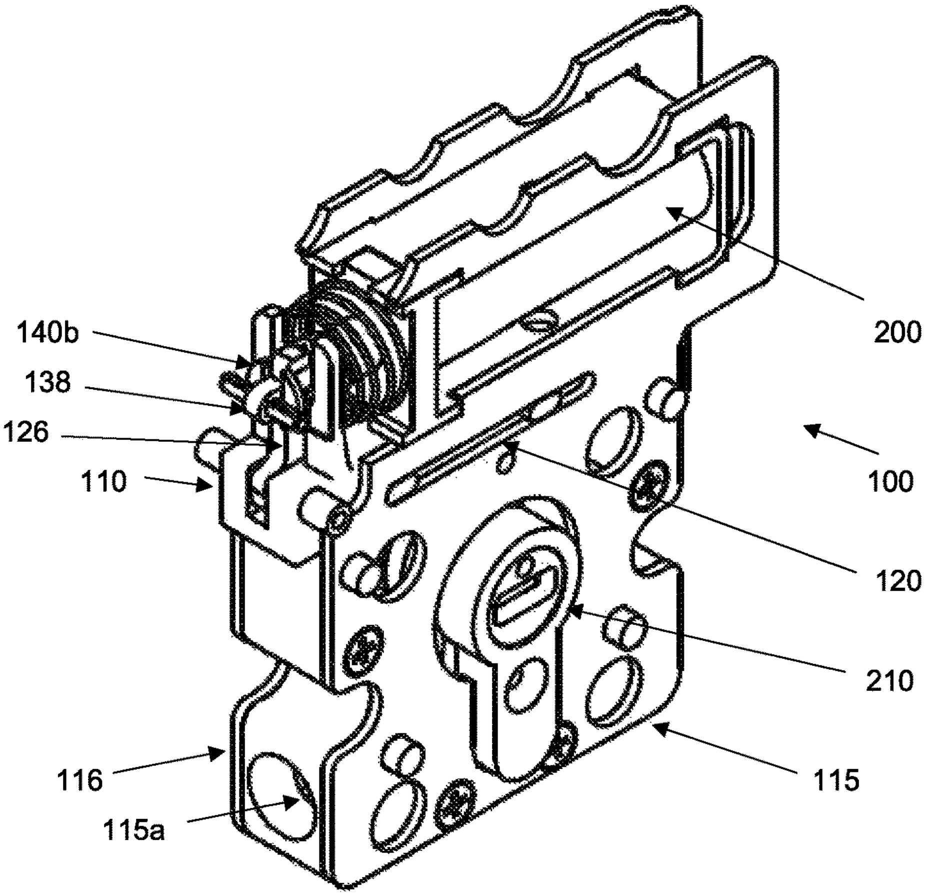
FIG. 5 is a perspective diagram of the deadbolt assembly according to a first embodiment the present invention.

FIGS. 4 and 5 show in more detail the deadbolt assembly 100. FIG. 4 is a plan view of the front of the deadbolt assembly. FIG. 5 is a perspective view of the deadbolt assembly. The sliding deadbolt 110 can be seen on the left of FIGS. 4 and 5. Also shown in FIGS. 4 and 5 as part of the deadbolt assembly are solenoid 200 and key cylinder 210.

Figure 6A:
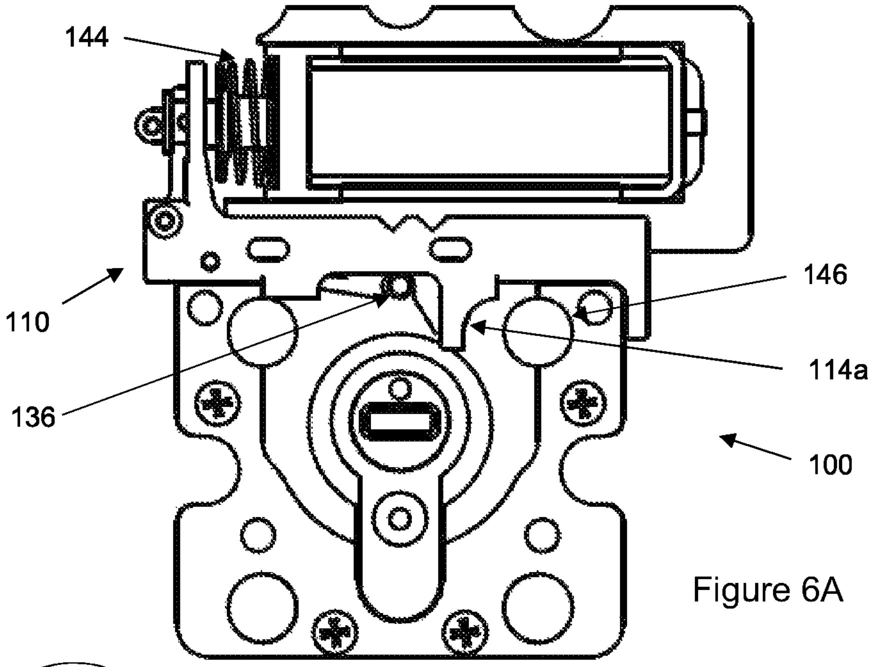
FIG. 6A is a plan view of the deadbolt assembly according to a first embodiment of the present invention.
Figure 6B:
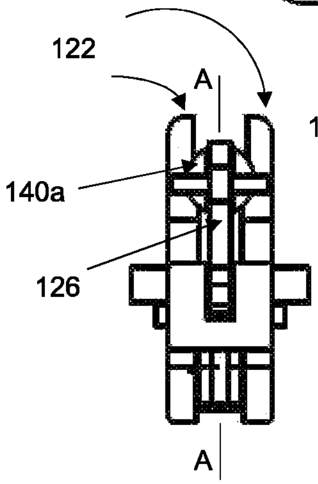
FIG. 6B is an end plan view of the sliding deadbolt including anti-thrust cams.
Figure 6C:
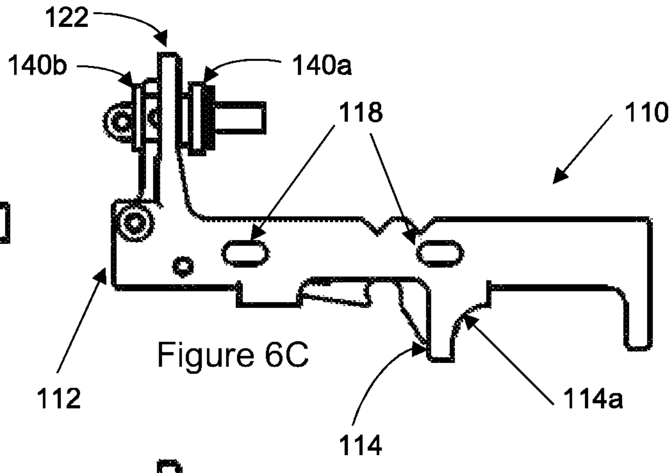
FIG. 6C is a front plan view of the sliding deadbolt including anti-thrust cams.
Figure 6D:
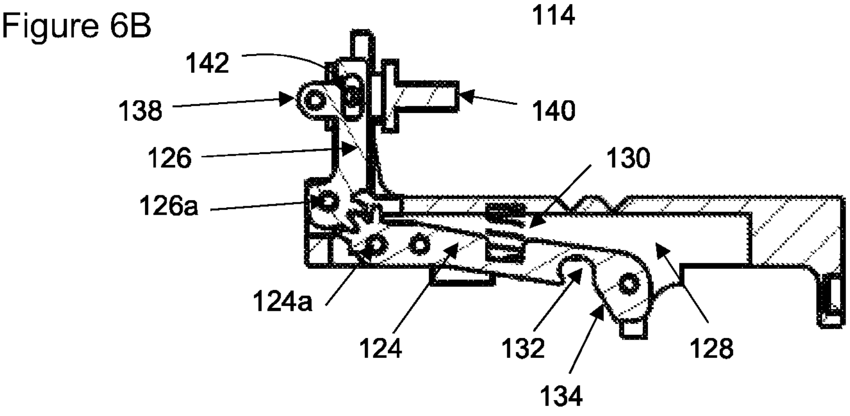
FIG. 6D is a cross-sectional view taken along the line A-A of the sliding deadbolt including anti-thrust cams.

FIG. 6A shows a view of the internal components of the deadbolt assembly 100, that is with a front plate 115 of casing removed. FIGS. 6B and 6C are front plan and end plan views of the sliding deadbolt 110 assembled to include anti-thrust cams. FIG. 6D is a cross-sectional view of the sliding deadbolt 110 taken along the line A-A of FIG. 6B. As shown in FIG. 6C, sliding deadbolt 110 is elongate and in operation is configured to slide in its elongate direction. The sliding deadbolt 110 has a first end 112, which may also be known as the head end, is shaped for location in the recess or cut-out 110*a* in bolt 11*b*. In FIGS. 6A-6D this head end 112 is shown to have a rectangular shape. Other shapes are possible but the shape should be such that the bolt can be restrained by the sliding deadbolt. For example, if a force is applied to the end of bolt 11*b* then the sliding deadbolt 110 prevents the bolt 11*b* being pushed in or retracted. Hence, a rectangular shape or shape which has parallel sides which in use will be orthogonal to the direction of movement of the bolt is preferred. Sliding deadbolt 110 further comprises a release feature which in the embodiment of FIG. 6A-6D is a release projection 114. The release projection 114 may also be known as a side arm. The side arm extends from the elongate direction of the sliding deadbolt 110, such as transversely or orthogonally to the sliding deadbolt. The sliding deadbolt 110 further comprises guides 118 which guide movement of the sliding deadbolt in the elongate direction. FIGS. 6A and 6C shown two such guides 118 which project from the side surface of the sliding deadbolt 110. The guides shown are elongate. Other shapes and numbers of guides are possible. One or more guides, preferably two guides, are provided on each side of the sliding deadbolt. The guides 118 shown in FIGS. 6A and 6C locate in a slot 120 in front plate 115 as shown in FIGS. 4 and 5. Further guides (not shown) locate in slot in rear plate 116 of the casing. The slot guides the movement direction, that is the sliding direction, of the sliding deadbolt plate 110. The extent of sliding may be limited by the length of the slot 120.

Sliding deadbolt further comprises a drive fork 122 projecting from the elongate direction of the sliding deadbolt 110, as shown in FIGS. 6B and 6C. The drive fork 122 projects transversely or orthogonally from the elongate direction or slide direction of the sliding deadbolt 110. The fork is for actuation of the sliding deadbolt 110 by solenoid 210. The release projection or side arm 114 of the sliding deadbolt 110 has a drive face and a cut-out 114*a* at the rear side, that is the opposite side to the drive face. The cut-out 114*a* is curved as shown in FIGS. 6A and 6C. The cut-out 114*a* is provided such that the side arm does not hit mounting feature or boss 146 when the sliding deadbolt is retracted. Mounting feature or boss may be a hole for receiving a fixing for mounting the deadbolt assembly 100 in the lock mechanism, or may alternatively be a boss or cylinder which also provides mounting of the deadbolt assembly 100 in the lock mechanism.

FIG. 6D shows first and second anti-thrust cams 124, 126. First anti-thrust cam 124 may be considered to have a shape resembling the head of a duck. First anti-thrust cam is at least partly located in a recess 128 in the sliding deadbolt, as shown in FIG. 6D. First anti-thrust cam may also be considered to be a rod or small bar. The first anti-thrust cam is pivoted towards one end at pivot 124*a*. The first anti-thrust cam 124 is biased by coiled spring 130 to pivot the distal end of the cam out of the recess 128 of the sliding deadbolt 110. The spring may be a small or low gauge spring. Other biasing arrangements are possible such as a lever spring or differently located coiled spring. In the embodiment shown the ends of the spring respectively locate in a hole in the anti-thrust cam and a hole in the sliding deadbolt. When acted on, the first anti-thrust cam 124 pivots into the recess 128 and the spring is compressed into the space provided by the holes. The end of the first anti-thrust cam 124 distal to the pivot 124*a* comprises a receiver 132 such as a socket or channel, which may have a circular or part circular cross-section and is for locating on pin or stud 136 as will be explained later. The end of the first anti-thrust cam 124 further comprises a drive face 134 which forms part of the duck's head shape, that is, it extends obliquely from the bar or rod direction of the anti-thrust cam.

FIG. 6D also shows second anti-thrust cam 126. The second anti-thrust cam extends towards the drive fork 122. As shown, in FIG. 6B, the second anti-thrust cam 126 extends between the two prongs of the drive fork 122. Second anti-thrust cam is pivoted at one end close to the first anti-thrust cam 124. FIG. 6D shows the pivot as 126*a*. As shown in FIG. 6D the first and second anti-thrust cams have teeth which intermesh to transfer rotational movement of one anti-thrust cam to the other. Intermeshing teeth are one embodiment, but other embodiments may provide alternatives for transferring rotational such as lever or camming surfaces or by belt or chain. The second anti-thrust cam 126 is shorter than the first anti-thrust cam 124. The second anti-thrust cam 126 comprises a projection 138, which may be known as the nose projection, which extends transversely from the length direction of the second anti-thrust cam. The nose projection 138 is arranged to be acted on for mechanical override of the sliding deadbolt as will be described later.

FIGS. 4 and 5 show solenoid 200. The second anti-thrust cam 126 is coupled to the core of the solenoid by 200 by connecting rod 140. The connecting rod 140 and second anti-thrust cam 126 are themselves coupled together by pin 142 located through holes at either side of the end of the connecting rod and through a slot in the second anti-thrust cam 126. The slot allows for some movement transverse to the direction of movement of the solenoid core as the second anti-thrust cam 126 rotates. Connecting rod 140 comprises first and second shoulders. The connecting rod 140 extends between the prongs of the drive fork 122, with the first shoulder 140*a* at the solenoid side of the drive fork and the second shoulder 140*b* beyond the drive fork 122. The space between the prongs of the drive fork accommodates the part of the connecting rod that is between the shoulders. The shoulders are wider than the space between the prongs of the drive fork so as to limit movement of the connecting rod with respect to the drive fork and also allow second anti-thrust cam 126 and connecting rod 140 to move a limited amount without moving the drive fork and sliding deadbolt 110. As shown in FIGS. 5 and 6D, the end of the connecting rod distal to the solenoid 200 comprises a slot in which the second anti-thrust cam 126 resides. The slot extends from the end of the connecting rod to the first shoulder 140*a*.

The sliding deadbolt 110 is biased to the thrown position for engagement in the bolt. The bias is provided by coiled spring 144 which pushes between the solenoid mounting and the drive fork 122. Other means of bias to the sliding deadbolt 110 may be provided and may be arranged at places other than between the drive fork 122 and solenoid mounting.

FIGS. 4, 5 and 6A show a key cylinder 210 mounted through apertures in the front plate 115 and rear plate of the casing. In alternative embodiments, the key cylinder may be replaced by a rim adaptor. Both a key cylinder and a rim adaptor have a rotatable tang. A key cylinder comprises a barrel which on receipt of a matching key allows rotation of the barrel and tang. A rim adaptor may be used in combination with a rim cylinder which has a rotatable tailpiece extending from its rear. The tailpiece may be inserted in to a slot in the rim adaptor for driving the tang of the rim adaptor in the same way as the key cylinder. The choice of whether to use a rim adaptor or key cylinder will depend on the desired placement and geometry at which the key is to be inserted. A rim adaptor and rim cylinder will place the key insert spaced away from the deadlock assembly. The rim adaptor or key cylinder may be fixed to the deadlock assembly by a screw or fixing through the casing such as through a hole 115*a* in side face of the casing.

In the following we refer to a key cylinder 210 throughout but this may instead be a rim adaptor. Hence, at any point in the following where a key cylinder is referred to this may be replaced with a rim adaptor.

Figure 7A:
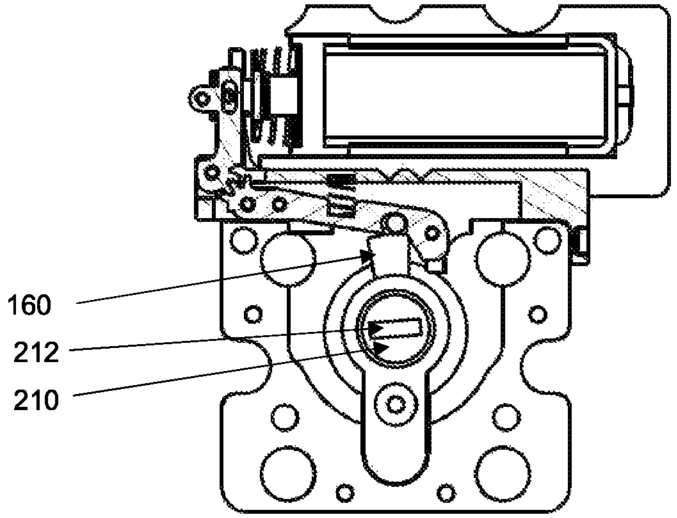
FIG. 7A is a plan views showing the operation of the deadbolt assembly including a tang rotated almost 180 degrees clockwise and almost at a vertically upward position.
Figure 7B:
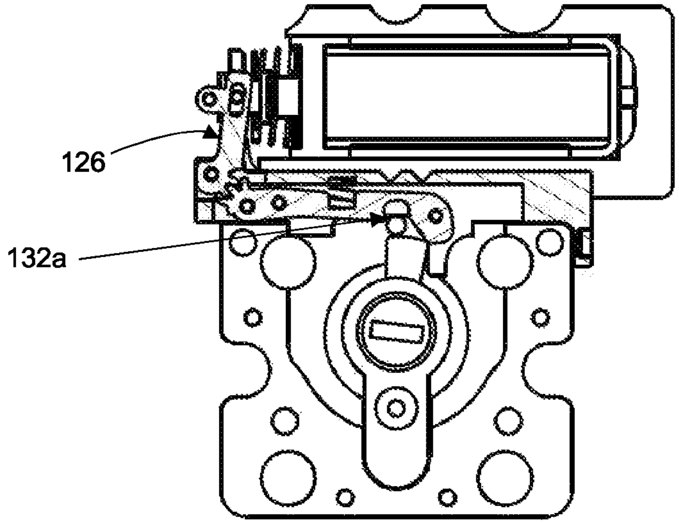
FIG. 7B is a plan views showing the operation of the deadbolt assembly including the tang rotated a little over 180 degrees.
Figure 7C:
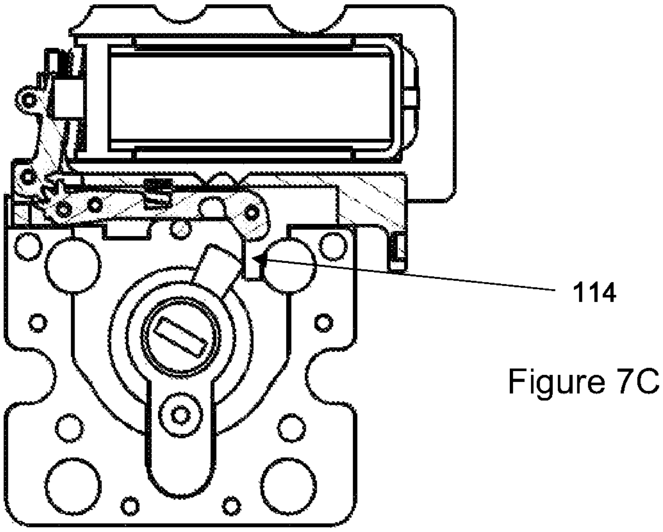
FIG. 7C is a plan view showing the operation of the deadbolt assembly including the tang rotated even further past 180 degrees.

We now describe operation of the deadbolt assembly 100 with reference to FIGS. 7A-7C. FIG. 7A shows the deadbolt assembly in cross-section taken through a plane coincident with line A-A of FIG. 6B. FIG. 7A shows key cylinder 210 in which plug or barrel has been rotated relative to the position shown in FIG. 6A. In FIG. 6A the key insert 212 of the barrel or plug is shown in the horizontal position and drive tang 160 of the key cylinder is not visible because it is in the downward vertical position and is hidden by the lobe of the key cylinder body. In FIG. 7A the tang 160 has been rotated almost 180 degrees clockwise and is almost at the vertically upward position. The key insert 212 of the key cylinder has also been rotated by almost 180 degrees and it is this rotation that has moved the tang 160. In FIG. 7A the tang 160 has just come into contact with the drive face 134 of the first anti-thrust cam 124 but has not yet caused the anti-thrust cam 124 to move. The sliding deadbolt 110 is maintained in the thrown position with receiver 132 of the anti-thrust cam 124 holding pin or stud 136 to prevent bouncing of the sliding deadbolt 110 or solenoid core.

In FIG. 7B the tang of the key cylinder has been rotated a little further by the key insert such that the tang has been rotated in total by a little over 180 degrees. In the figure, the tang is shown to be just past the upwards vertical position. In this figure, the tang 160 has pushed against the drive face 134 of the first anti-thrust cam 124 lifting its distal end up such that the receiver 132 no longer holds the pin 136. The lifting up of the distal end of the first anti-thrust cam 124 is a small rotation about its pivot 124*a*, which as shown in FIG. 7B is in the anticlockwise direction. The first anti-thrust cam 124 has been lifted up sufficiently such that the tang has come into contact with the release projection or side arm 114 of the sliding deadbolt 110. Continued turning of the key insert 212 of the key cylinder 210 will rotate tang 160 further and push against the side arm 114 to retract the sliding deadbolt 110, as shown in FIG. 7C. This further pushing of the side arm 114 causes the first anti-thrust cam to be pushed further in to the recess in the sliding deadbolt such that receiver is completely clear of pin 136 and retraction of the sliding deadbolt 110 is not hindered by the first anti-thrust cam 124.

The receiver 132 of the first anti-thrust cam 124 surrounds around half to two-thirds of the pin 136 as shown in FIG. 7A. At the position in FIG. 7B the receiver is not quite clear of the pin but because the edge 132*a* of the channel of the receiver has passed the midpoint of the pin 136, the edge of the receiver channel will be pulled around and over the pin as the sliding deadbolt 110 is retracted. It is expected that parts may wear. As this happens the anti-thrust cam may not lift as high. However, because it is only required that the edge 132*a* of the receiver channel is moved beyond halfway above the pin 136, the retraction of the sliding deadbolt will lift the first anti-thrust cam 124 clear of the pin. In FIG. 7C, after the first anti-thrust cam has been released from pin, the anti-thrust cam is pushed into the aperture or recess in the sliding deadbolt. The underside of the sliding deadbolt slides against pin 136 with the pin holding the anti-thrust cam clear to allow retraction of the sliding deadbolt until such a time that the sliding deadbolt is one again moved to the thrown or locked position.

FIGS. 7A to 7C also show operation of the second anti-thrust cam 126. In FIG. 7A the solenoid core is extended and the second anti-thrust cam is in the near vertical position. The intermeshing teeth of the first and second anti-thrust cams means that rotation of one of the anti-thrust cams results in rotation of the other of the anti-thrust cams.

Hence, in the preceding we have discussed that the first anti-thrust cam 124 is rotated during the retraction of the sliding deadbolt 110 by the tang of the key cylinder. As a result of this rotation the second anti-thrust cam 126 will also be rotated. The second anti-thrust cam 126 will be rotated in the opposite direction to the first anti-thrust cam 124. The rotation of the second anti-thrust cam 126 will cause retraction of the solenoid core into the solenoid. However, we can also use FIGS. 7A-7C to describe retraction of the sliding deadbolt 110 when operated by the solenoid. In this operation mode the position of the tang of the key cylinder is not relevant and can be considered not to be moved from the position shown in FIG. 6A.

Accordingly, we now describe retraction of the sliding deadbolt 110 by operation of the solenoid 200. As described in the preceding, the solenoid 200 may be configured to retract the solenoid core from an extended position either on application of a voltage or removal of a voltage. In the present case it is preferred that a voltage is applied to retract the solenoid core. This provides a fail secure arrangement such that when there is no power the deadbolt remains thrown and the bolting mechanism is secured. In FIG. 7B the solenoid core has been retracted and has pulled on connecting rod 140. The connecting rod is coupled to the second anti-thrust cam 126 at pin 142 and the retraction pulls the distal end of the second anti-thrust cam 126 causing it to rotate about its pivot 126*a*. The intermeshing teeth with the first ant-thrust cam 124 causes the first anti-thrust cam 124 to also rotate but in the opposite direction to the second anti-thrust cam 126. Hence, the distal end of the first anti-thrust cam is lifted upwards releasing the receiver 132 from the pin 136. Once this has been released, further operation of the solenoid such as by supplying power causes the second shoulder 140*b* of connecting rod to come into contact with drive fork 122 of the sliding deadbolt 110 and pulls the drive fork towards the solenoid. As a result, the whole of the sliding deadbolt 110 is retracted. This is shown in FIG. 7C where the sliding deadbolt can be seen to have moved to the right.

Accordingly, in a similar way to we described the key cylinder as first releasing the first anti-thrust cam 124 before retracting the sliding deadbolt 110, the solenoid 200 first moves the anti-thrust cams 124, 126 before retracting the sliding deadbolt 110.

The deadbolt assembly 100 which restrains movement of a bolt such as for a multi-point bolting mechanism may comprise a mechanical override as we will now describe with reference to FIGS. 3 and 8A-8C. We will first describe in more detail the operation of the mechanism of the multi-point bolting mechanism of FIG. 3.

As described earlier, the mechanism of FIG. 3 is a multi-point bolting mechanism comprising three bolts which are driven by two teethed rotors. The mechanism may be driven by a handle coupled to rotor 21 by a spindle. As shown in FIG. 3, there is provided a spring assembly 23 which provides a bias to throw the three bolts outward when the handle is released. The bias pushes the linear toothed element of spring assembly 23 upwards, such as to the positon shown in the figure, which causes rotor 21 to rotate anticlockwise and throw the three bolts 11*a*, 11*b* and 11*c*.

Each of the bolts 11*a*, 11*b* and 11*c* is provided with a slider, which are respectively denoted by 11*as*, 11*bs* and 11*cs*. The sliders overlie their respective bolts. The slider 11*bs* for the top bolt 11*b* has teeth which engage with the teeth of upper rotor 20. The slider 11*as* for the central bolt 11*a*, which moves laterally, has teeth which engage with the teeth of both upper rotor 20 and lower rotor 21. The slider 11*cs* for the bottom bolt 11*c* has teeth which engage with the teeth of lower rotor 21. There is lost-motion between the bolts and their respective sliders. Movement of the sliders are guided by pins in slots. For example, the slider 11*as* of central bolt is shown in FIG. 3 as having two slots. Into each slot a pin or stud from the bolt extends. Movement of the slider with respect to the bolt is limited by the length of the slot. Similarly, slider 11*bs* of top bolt is guided by a single pin or stud extending into a single slot. Slider 11*cs* for the bottom bolt 11*c* is guided by a single elongate stud.

For each of the bolts the teeth of the sliders engage with the rotors. In the arrangement of FIG. 3, on rotation of the handle clockwise the first part of the rotation of lower rotor 21 causes slider 11*as* of central bolt 11*a* to slide to the right and toothed element of spring assembly 23 to move downwards. Since the teeth of upper rotor 20 are engaged with the teeth of the central slider 11 as, the movement of the central slider 11 as causes the upper rotor 20 to rotate anti-clockwise. This rotation causes slider 11*bs* of top bolt 11*b* to move downwards. When the sliders have retracted to the end of their travel, that is, they have been retracted until the end of the slots abut against the respective pins or studs, continued turning of the handle now starts retraction of the bolts 11*a*, 11*b*, 11*c* themselves.

Figure 8A:
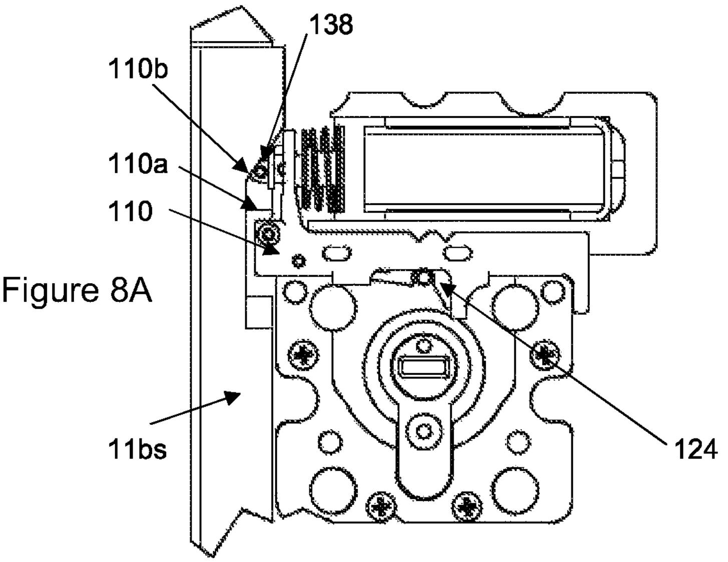
FIG. 8A is a plan view showing the deadbolt assembly in a thrown position.

In an alternative to the above discussion, the sliders and two rotors 20 and 21 may be replaced by an arrangement of four rotors as described in GB 2520666 by the current applicant. Here the rotors are arranged as two pairs, with the two rotors of each pair rotating on a common axis. A slider is retained on the central bolt between the rotors. Lost motion is provided between the two rotors in a pair. In other implementations, aspects of the arrangement disclosed in GB 2520666 and FIG. 3 of the current application may be combined. However, the multi-point bolting mechanism of FIG. 3 is provided as an illustration of an application of the deadbolt assembly and the deadbolt assembly may be applied to numerous other lock mechanisms comprising a bolt. Furthermore, the deadbolt assembly is not limited to operation on the upper bolt of a multi-point bolting mechanism but may be applied to any of the other bolts, and multiple deadlock assemblies may be applied. For example, deadlock assemblies may be used on the upper and lower bolts. Returning to FIG. 3, the upper bolt 11*b* is acted on by the deadbolt assembly 100 which we have described earlier in relation to FIGS. 4-7. We now describe the mechanical override of the deadbolt assembly. FIGS. 3 and 8A show the sliding deadbolt 110 in the thrown position extending into recess 110*a* in bolt 11*b*. Slider 11*bs* for bolt 11*b* is also shown. The right hand side of FIG. 8A, for clarity, shows the different features schematically. The end of the sliding deadbolt 110 is indicated by a solid line forming three sides of a rectangle. The recess 110*a* in the bolt 11*b* is also shown by a solid line. It can be seen that the recess is rectangular. The slider 11*bs* also has a recess 110*b* which is shown by dashed line in the right hand side figure of FIG. 8A. The recess 110*b* in slider 11*bs* has a lower end which is rectangular and an upper end which has a sloping edge. Also shown in FIG. 8A is projection 138, also known as nose projection, of the second anti-thrust cam 126. In the position shown in FIG. 8A the bolt 11*b* cannot be driven back by a force applied to the end of the bolt because the upper edge of the recess 110*a* of the bolt will hit the end of the sliding deadbolt 110.

Figure 8B:
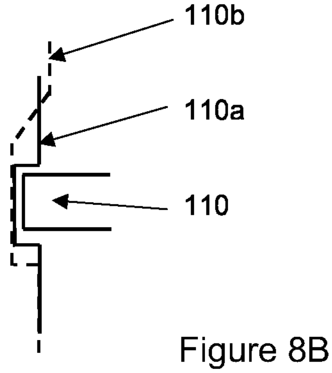
FIG. 8B is a schematic illustration of certain features of the deadbolt assembly shown in FIG. 8A.
Figure 8C:
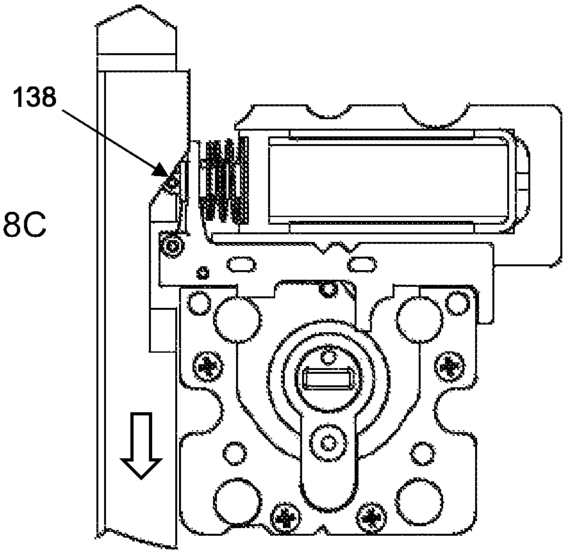
FIG. 8C is a plan view showing the deadbolt assembly with a slider moved downwards to allow a bolt to be retracted.
Figure 8D:
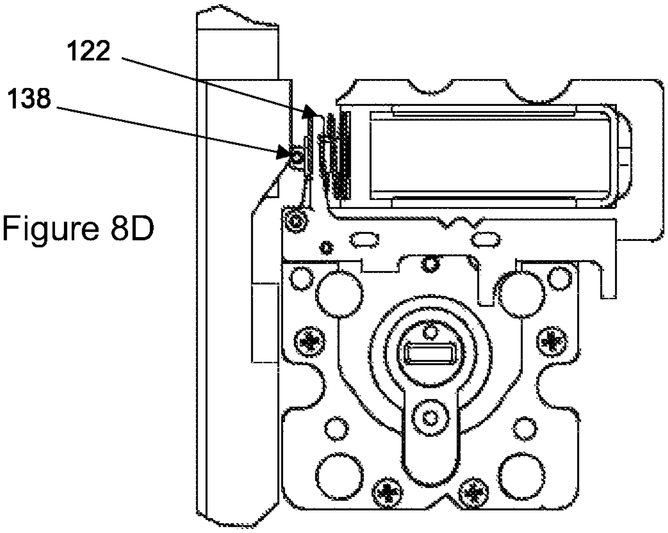
FIG. 8D is a plan view showing the deadbolt assembly with a sliding deadbolt retracted from a recess in the bolt.

FIGS. 8B and 8C show how the sliding deadbolt 110 is mechanically overridden to allow the bolt 11*b* to be retracted. In FIG. 8B the slider 11*bs* has been moved downwards. This will have been caused by rotation of the handle as described in relation to FIG. 3 on the preceding pages. The sloping edge of the recess 110*b* of the slider 11*bs* is now pushing against the nose projection 138 of the sliding deadbolt 110. This rotates the second anti-thrust cam 126 to the position shown in FIG. 7B. The intermeshing teeth of the first and second anti-thrust cams results in rotation of the first anti-thrust cam 124 such that the receiver 132 is lifted substantially clear of pin 136 as described above in relation to FIG. 7B. The lifting of the distal end of the first anti-thrust cam 124 can also be seen by comparing FIG. 8B to 8A. As the first anti-thrust cam 124 has been moved clear of pin 136, the sliding deadbolt can now be retracted. This is shown in FIG. 8B. The slider 11*bs* of the bolt has been moved downwards further such that the slope of the recess 110*b* has been moved downwards beyond the projection 138. Hence, the slider pushes the projection further towards the solenoid and thereby also pushes drive fork 122 towards the solenoid to retract the sliding deadbolt 110. As can be seen in FIG. 8C the sliding deadbolt is retracted from the recess 110*a* in the bolt 11*b* and the bolt 11*b* can now be retracted. This will be achieved by further turning of handle and rotors.

As described, the sliding deadbolt 110 can be released and retracted using three different actions, namely by action of a tang of a key cylinder or rim adaptor; by action of the solenoid; or by mechanical override. The sliding deadbolt and its anti-thrust cams prevent the solenoid and sliding deadbolt from being manipulated, perhaps only even momentarily, to the retracted positions.

Although we have described the alternatives for when the solenoid is powered it may be preferable if the solenoid is configured such that power is applied for retraction and maintaining in the retracted position the sliding deadbolt 110. This would mean that the sliding deadbolt could be unpowered for most of the time because the sliding deadbolt would be thrown for most of the time. This would save power and provide a fail-secure mode in which during a loss of power the sliding deadbolt remains thrown and the bolting mechanism is secured. In such a configuration retraction of the sliding deadbolt by the key cylinder or by the mechanical override would not be impeded by the solenoid. Conversely, if the solenoid was required to be powered all the time the sliding deadbolt is in the thrown position this would provide a fail-safe mode in which during a loss of power the sliding deadbolt would be retracted and the bolting mechanism would be released. In this manner, the solenoid configuration can be suitably selected for the desired mode during a loss of power. For example, if free-escape from a building is desired in the event of loss of power, the fail-safe mode would be selected. In the arrangement in which the solenoid is powered in the thrown position, this may provide a resistance, but does not prevent retraction of the sliding deadbolt by the key cylinder or mechanical override. In this alternative arrangement the solenoid is flipped around such that the spring 144 biases the solenoid core at the other end of the assembly. In another embodiment the solenoid could be used to throw and retract the sliding deadbolt and is only powered during the actions of throwing or retracting the sliding deadbolt. In such a case the sliding deadbolt 110 would be maintained in the thrown position by the first anti-thrust cam's receiver 132 and pin 136.

We have described above how the sliding deadbolt 110 is retracted to allow the bolt(s) to be retracted. We now describe the process of throwing the sliding deadbolt and consequent operation of the anti-thrust cams. In FIG. 7C the sliding deadbolt has been retracted by the key cylinder, the solenoid or by the mechanical override. From this position, on turning the tang 160 of the key cylinder anti-clockwise to bring the tang back into line with the lobe of the cylinder body, there is no longer anything holding the sliding deadbolt in the retracted position. As a result spring 144 pushes drive fork 122 away from the solenoid and its mounting moving the sliding deadbolt 110 towards the thrown position. As the sliding deadbolt 110 moves towards the thrown position, the first anti-thrust cam 124 moves under bias of spring 130 to cause it to rotate and push the distal end out of recess 128. As the sliding deadbolt 110 moves further towards the thrown position the receiver 132 will drop on to pin 136. Once this has happened the first anti-thrust cam is in position to prevent bouncing of the sliding deadbolt. Since the second anti-thrust cam 126 has teeth in engagement with the first anti-thrust cam 124, rotation of the first anti-thrust cam will result in rotation of the second anti-thrust cam 126 and both anti-thrust cams will be returned to the positions shown in FIG. 7A.

Although we have described the throwing of the sliding deadbolt 110 with reference to operation of the key cylinder, the process of throwing the sliding deadbolt is similar whether by action of the solenoid or release of the mechanical override. With regard to the solenoid, once the solenoid core has been released, such as power turned off, the spring 144 will push the sliding deadbolt to the thrown position and the anti-thrust cams will move as described in the preceding paragraph. The mechanical override will be released when the bolt 11*b* moves back upwards to the thrown position as shown in FIG. 8A and the sliding deadbolt 110 is biased by spring 144 to push into recess of 110*a* of bolt.

As described above, the deadbolt assembly comprises three means for operating the sliding deadbolt 110. The key cylinder provides conventional operation by a user with a key matching the key cylinder who is at the location. The solenoid provides operation by means of an access control system. Such a system may have various implementations and modes of operations but release of the sliding deadbolt is caused by an electrical signal being received at a controller at the lock mechanism. In one access control arrangement a user may be provided with an electronic swipe card which on presentation at a sensor at the door provides the electronic signal for release. Alternatively, the electronic signal may be provided remotely such as from a control room or site office, to retract the sliding deadbolt between, for example, working hours of a day or week. Such a signal may be provided wireless or by wired means. The mechanical override advantageously may provide emergency egress from a building. For example, a door on which the lock mechanism is mounted may provide an exit for persons from a building in an emergency. Turning of the handle on the inside of the door operates the mechanical override and allows the bolts to be retracted. Without the mechanical override it would be necessary for the person to have the key matching the key cylinder. Operations by the key cylinder could be retained for opening of the door from the outside of the building.

Figure 9A:
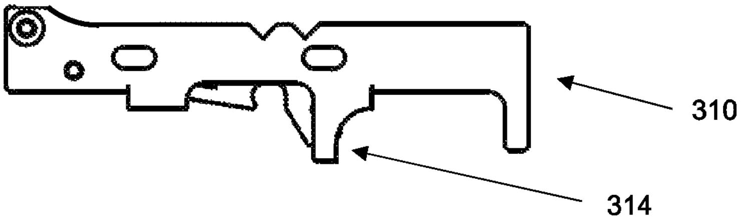
FIG. 9A is a front plan view of an alternate embodiment of a sliding deadbolt including an anti-thrust cam.
Figure 9B:
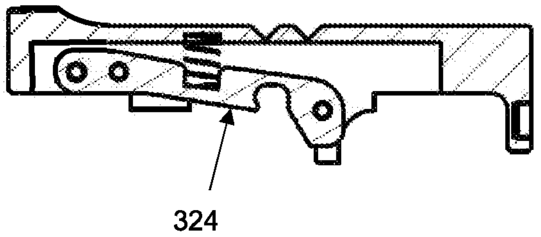
FIG. 9B is a cross-sectional view of the alternate embodiment sliding deadbolt including the anti-thrust cam.
Figure 9C:
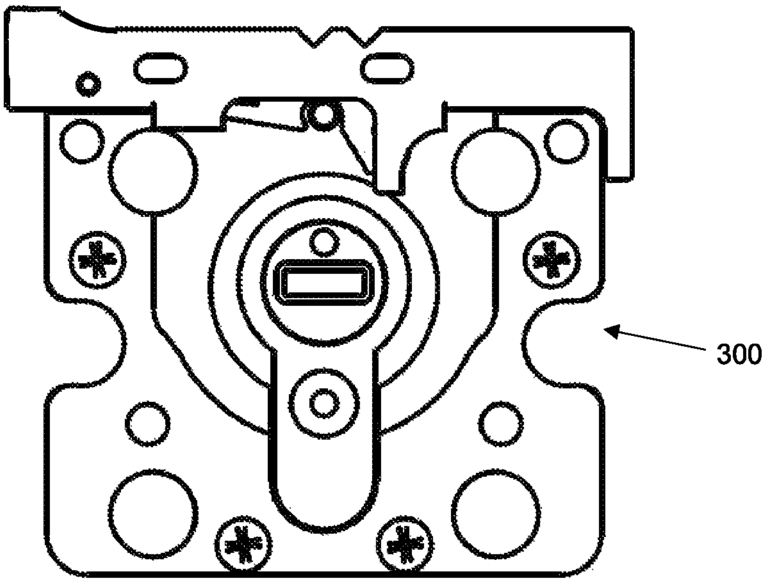
FIG. 9C is a plan view of the alternate embodiment sliding deadbolt and a deadbolt assembly.

FIGS. 9A-C show an alternative embodiment of deadbolt assembly. This embodiment is operated by a key cylinder or rim adaptor alone. This embodiment is similar to the preceding embodiments but does not include the second anti-thrust cam 126. Hence, retraction of the sliding deadbolt is by the key cylinder only. Similar to the preceding embodiments, a rim adaptor may be used in place of the key cylinder. FIG. 9*c* shows deadbolt assembly 300 comprising key cylinder and sliding deadbolt 310. Sliding deadbolt is shown in more detail in FIGS. 9A and 9B. FIG. 9B shows the sliding deadbolt cut through in cross-section in the same plane as the cross-section of FIG. 6D. In the cross-section the first anti-thrust cam 324 of this embodiment can be seen clearly and is similar to the first anti-thrust cam 124 of preceding embodiments. The first anti-thrust cam 324 is pivoted at one end and biased by spring in a similar manner to the preceding embodiments. It also comprises a receiver, which may be a channel, which locates around a pin or stud configured between front and back plates of the casing. The sliding deadbolt 310 comprises release projection 314 which is described as side-arm in the above embodiments. Hence, as can be appreciated many of the features of this alternative embodiment correspond to those of the preceding embodiments. Operation of this alternative embodiment is also similar to the preceding embodiments when driven by the key cylinder. In the same way as described above, on receipt of a matching key in the key cylinder, the tang of the key cylinder is rotated clockwise. At close to 180 degrees of rotation the tang pushes against the drive face of the anti-thrust cam 324 lifting/rotating the cam such that the pin is released from the receiver. Further rotation of the tang of the key cylinder pushes against the side arm 314 of the sliding deadbolt 310 to retract the sliding deadbolt. To throw the sliding deadbolt 310 the tang of the key cylinder is returned to bring it into line with the lobe of the key cylinder body. A bias provided on the sliding deadbolt pushes it into the thrown position. For this embodiment the bias is provided differently and may be provided by a spring hidden inside the sliding deadbolt which pushes against a feature of the casing. Other biasing arrangements are also possible.

Other embodiments based on the embodiment of FIGS. 9A-9C are also possible in which the sole means of retracting the sliding deadbolt is by a solenoid or by a mechanical override.

The person skilled in the art will readily appreciate that various modifications and alterations may be made to the above described deadbolt assembly. The modifications may be made without departing from the scope of the appended claims. For example, the first and second anti-thrust cams may be instead be arranged without teeth but to drive each other by lever action or the use of a belt or chain. The solenoid may be replaced with a motor such as a worm drive motor providing linear movement in a similar manner to the solenoid. Furthermore, variations in the actual shapes of the parts such as the sliding deadbolt, anti-thrust cams, rotors, sliders and bolt may be made without diverging from the general scope of the present invention.

What is claimed:

1. A lock mechanism, comprising:

a bolt movable between a thrown position and a retracted position; and a deadbolt assembly comprising:

a sliding deadbolt configured to slide between a locked position in which the sliding deadbolt inhibits retraction of the bolt and an unlocked position, the sliding deadbolt comprising a first anti-thrust cam configured to restrain the sliding deadbolt in the locked position, and a release driver arranged such that, when driven, the release driver releases the first anti-thrust cam from restraining the sliding deadbolt in the locked position and slides the deadbolt to the unlocked position wherein the first anti-thrust cam is a receiver and the deadbolt assembly is a detent attached to a casing part of the deadbolt assembly, and when the first anti-thrust cam restrains the sliding deadbolt in the locked position the receiver engages the detent.

2. The lock mechanism of claim 1, wherein the release driver is one or more of the group comprising: a rotatable tang of a key cylinder or rim adaptor; a core of a solenoid; a motor and a mechanical override.

3. The lock mechanism of claim 1, wherein the first anti-thrust cam is pivotably coupled to the sliding deadbolt and the sliding deadbolt comprises an aperture into which the first anti-thrust cam moves under action of the release driver.

4. The lock mechanism of claim 3, wherein the first anti-thrust cam is pivotably coupled to the sliding deadbolt towards an end of the sliding deadbolt that inhibits retraction of the bolt.

5. The lock mechanism of claim 3, wherein the first anti-thrust cam is biased such that the distal end of the anti-thrust cam is pushed out from the aperture when the first anti-thrust cam restrains the sliding deadbolt.

6. The lock mechanism of claim 3, wherein the first anti-thrust cam comprises a release surface at an end distal to its pivot and the release driver comprises a rotatable tang of a key cylinder or rim adaptor, wherein the key cylinder or rim adaptor is configured such that on rotation of the tang the tang pushes against the release surface releasing the first anti-thrust cam.

7. The lock mechanism of claim 1, wherein the receiver comprises a channel and the detent comprises a pin or stud which locates in the channel when the first anti-thrust cam restrains the sliding deadbolt in the locked position.

8. A lock mechanism, comprising:

a bolt movable between a thrown position and a retracted position; and a deadbolt assembly comprising:

a sliding deadbolt configured to slide between a locked position in which the sliding deadbolt inhibits retraction of the bolt and an unlocked position, the sliding deadbolt comprising a first anti-thrust cam configured to restrain the sliding deadbolt in the locked position and a second anti-thrust cam pivotably coupled to the sliding deadbolt and configured for rotational movement in cooperation with the first anti-thrust cam, and a release driver arranged such that, when driven, the release driver releases the first anti-thrust cam from restraining the sliding deadbolt in the locked position and slides the deadbolt to the unlocked position.

9. The lock mechanism of claim 8, wherein the release driver is arranged such that when driven it rotates the second anti-thrust cam causing rotation of the first anti-thrust cam releasing the first anti-thrust cam from restraining the sliding deadbolt in the locked position and sliding the deadbolt to the unlocked position.

10. The lock mechanism of claim 8, wherein the first anti-thrust cam and second anti-thrust cam comprise intermeshing teeth to transfer rotational movement between the first anti-thrust cam and second anti-thrust cam.

11. The lock mechanism of claim 8, wherein the sliding deadbolt comprises a drive fork and the second anti-thrust cam is arranged between the prongs of the drive fork.

12. The lock mechanism of claim 11, wherein the drive fork of sliding deadbolt projects transversely to the slide direction of the sliding deadbolt, and the lock mechanism further comprises a solenoid having a core connected to a drive rod, the drive rod coupled to the second anti-thrust member and between the prongs of the drive fork, the drive rod configured to drive the second anti-thrust member and the sliding deadbolt for release of the sliding deadbolt.

13. The lock mechanism of claim 8, wherein the release driver is a solenoid or motor and the second anti-thrust cam is arranged to be driven by the solenoid or motor.

14. The lock mechanism of claim 8, further comprising an additional release driver which is the mechanical override, wherein the mechanical override comprises a projection extending transversely from the second anti-thrust cam and arranged to be acted on for rotational movement of the second anti-thrust cam to release the sliding deadbolt.

15. The lock mechanism of claim 14, wherein the bolt, or a slider of the bolt, is arranged to push against the projection to rotate the second anti-thrust cam and release the sliding deadbolt as the bolt is moved to the retracted position.

16. The lock mechanism of claim 8, wherein the second anti-thrust cam is pivoted towards an end proximal to the first anti-thrust cam.

17. The lock mechanism of claim 1, wherein the release driver includes a key cylinder or rim adaptor, and the sliding deadbolt comprises a release surface configured to be acted on by the rotatable tang of the key cylinder or rim adaptor such that on rotation of the tang, the tang releases the first anti-thrust cam, and pushes against the release surface of the sliding deadbolt to retract the sliding deadbolt and release the bolt for movement.

18. The lock mechanism of claim 17, wherein the sliding deadbolt comprises a side arm projecting transversely from the slide direction of the sliding deadbolt and the release surface is provided on the sidearm.

19. The lock mechanism of claim 1, further comprising front and back plates between which the sliding deadbolt is configured to move, the sliding deadbolt comprising guides arranged to move in slots of the front and back plates to guide movement of the sliding deadbolt between the locked position and the unlocked position.

20. The lock mechanism of claim 19, wherein the front and back plates further comprise apertures through which a key cylinder or rim adaptor is mounted.

21. The lock mechanism of claim 1, wherein the bolt comprises a recess, which in the retracted position, is configured to receive an end of the sliding deadbolt to inhibit retraction of the bolt.

22. A multi-point bolting mechanism comprising the lock mechanism of claim 1, and further comprising one or more additional bolts arranged to be driven together with the bolt of the lock mechanism.

23. A deadbolt assembly, comprising:

a sliding deadbolt configured to slide between a locked position in which the sliding deadbolt inhibits retraction of a further bolt and an unlocked position, the sliding deadbolt including (a) a first anti-thrust cam configured to restrain the sliding deadbolt in the locked position, (b) a second anti-thrust cam pivotably coupled to the sliding deadbolt and configured for rotational movement in cooperation with the first anti-thrust cam, and (c) a release driver arranged such that, when driven, the release driver releases the first anti-thrust cam from restraining the sliding deadbolt in the locked position and slides the deadbolt to the unlocked position.

24. A bolting mechanism comprising the deadbolt assembly of claim 23.

* * * * *